US008481601B2

(12) United States Patent
Das et al.

(10) Patent No.: US 8,481,601 B2
(45) Date of Patent: *Jul. 9, 2013

(54) PROCESS OF SYNTHESIS GAS CONVERSION TO LIQUID HYDROCARBON MIXTURES USING A CATALYST SYSTEM CONTAINING RUTHENIUM AND AN ACIDIC COMPONENT

(75) Inventors: Tapan Das, Albany, CA (US); Kandaswamy Jothimurugesan, Hercules, CA (US); Charles L Kibby, Benicia, CA (US); Robert J. Saxton, Pleasanton, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 316 days.

This patent is subject to a terminal disclaimer.

(21) Appl. No.: 12/953,042

(22) Filed: Nov. 23, 2010

(65) Prior Publication Data

US 2012/0129960 A1 May 24, 2012

(51) Int. Cl.
*C07C 27/00* (2006.01)

(52) U.S. Cl.
USPC .......................................... 518/715; 518/700

(58) Field of Classification Search
USPC ................................................ 518/700, 715
See application file for complete search history.

(56) References Cited

U.S. PATENT DOCUMENTS

| | | | |
|---|---|---|---|
| 4,279,830 A | 7/1981 | Haag et al. | |
| 4,304,871 A | 12/1981 | Brennan et al. | |
| 4,595,702 A | 6/1986 | Chu et al. | |
| 4,617,288 A | 10/1986 | Bell et al. | |
| 6,225,359 B1 | 5/2001 | O'Rear et al. | |
| 6,410,814 B2 | 6/2002 | Fujimoto et al. | |
| 6,472,441 B1 | 10/2002 | Kibby | |
| 7,157,501 B2 | 1/2007 | Steenwinkel et al. | |
| 7,297,825 B2 | 11/2007 | Fujimoto et al. | |
| 7,459,485 B2 | 12/2008 | Botes et al. | |
| 7,507,326 B2 | 3/2009 | Farshid et al. | |
| 2001/0027259 A1 | 10/2001 | Fujimoto et al. | |
| 2006/0167119 A1 | 7/2006 | Leng et al. | |
| 2009/0124712 A1 | 5/2009 | De Figueiredo Costa et al. | |

FOREIGN PATENT DOCUMENTS

| | | |
|---|---|---|
| EP | 2514525 | 10/2012 |
| WO | WO 94/04476 | 3/1994 |

OTHER PUBLICATIONS

J.M. Stencel, et al., Dual Cobalt Speciation in Co/ZSM-5 Catalysts, Journal of Catalysis 84, pp. 109-118, 1983.

T. J. Huang, et al. Aromatic Gasoline from hydrogen/Carbon Monoxide Over Ruthenium/Zeolite Catalysts, Catalytic Activation of Carbon Monoxide, ACS Symposium Series, American Chemical Society, 1981.

Agustin Martinez, et al., The Application of Zeolites and Periodic Mesoporous Silicas in the Catalytic Conversion of Synthesis Gas, Top Catal, 2009, 52; 75-90.

Yu-Ping Li, et al., Gasoline-range hydrocarbon synthesis over ?o/SiO2/HZSM-5 catalyst with Co2-containing syngas, Fuel Processing Technology 91 (2010) 388-393.

Xiaohong Li, et al., Direct Synthesis of Middle Iso-Paraffins from Synthesis gas, Catalysis Today 84 (2003) 59-65.

Xiohong Li, et al., Synthesis of Isoparaffins from Synthesis Gas, Studies in Surface Science Catalysis, vol. 147, pp. 367-372, 2004.

Yanyong Liu, et al., Selective Hydrocracking of Fischer-Tropsch Waxes to High-quality Diesel Fuel Over Pt-promoted Polyoxocation-pillard Montmorillomites, Top Cata, vol. 52, pp. 597-608, 2009.

Zhong-Wen Liu, et al., High Performance Pd/beta Catalyst for the Production of Gasoline-Range Iso-paraffins Via a Modified Fischer-Tropsch Reaction, Applied Catalysis, pp. 162-169, 2006.

Zhong-Wen Liu, et al., Selective Production of Iso-Paraffins From Syngas Over Co/SiO2 and Pd/beta Hybrid Catalysts, Catalysis Communications, vol. 6, pp. 503-506, 2005.

Zhong-Wen Liu, et al., Iso-paraffins Synthesis From Modified Fischer-Tropsch Reaction—Insights Into Pd/beta and Pt-/beta Catalyst, Catalysis Today, vol. 104, pp. 41-47, 2005.

Zhong-Wen Liu, et al., Formation of Isoparaffins Through Pd/ &Zeolite Application in Fischer-Tropsch Synthesis, Energy and Fuels, vol. 19, pp. 1790-1794, 2005.

Insung Nam, et al., Production of Middle Distillate from Synthesis Gas in a Dual-bed Reactor Through Hydrocracking of Wax Over Mesoporuis Pd-Al2O3 Composite Catalyst, Catal. Lett, 130: 192-197, 2009.

Agustin Martinez, et al., A detailed study of the activity and deactivation of Zeolites in hybrid Co/SiO2-zeolite Fischer-Tropsch catalyst, Journal of Catalysis 249, pp. 162-173, 2007.

Pour, et al., Deactivation studies of bifunctional Fe-HZSM5 catalyst in Fischer-Tropsch process, Journal of Natural Gas Chemistry, 17, pp. 242-248, 2008.

Subrinas, et at., Combining Fischer-Tropsch (FT) and Hydrocarbon Reactions under FT Reaction Conditions—Catalyst and Reactor Studies with Co or Fe and Pt/ZSM-5, International Journal of Chemistry Reactor Engineering, vol. 5, 2007.

*Primary Examiner* — Jafar Parsa

(74) *Attorney, Agent, or Firm* — Karen R. DiDomenicis; Richard Schulte

(57) ABSTRACT

The disclosure relates to a method of performing a synthesis gas conversion reaction in which synthesis gas contacts a catalyst system including a mixture of ruthenium loaded Fischer-Tropsch catalyst particles and at least one set of catalyst particles including an acidic component promoted with a noble metal, e.g., Pt or Pd. The reaction occurs at conditions resulting in a hydrocarbons product containing 1-15 weight % $CH_4$, 1-15 weight % $C_2$-$C_4$, 70-95 weight % $C_{5+}$, 0-5 weight % $C_{21+}$ normal paraffins, and 0-10 weight % aromatic hydrocarbons.

19 Claims, No Drawings

PROCESS OF SYNTHESIS GAS CONVERSION TO LIQUID HYDROCARBON MIXTURES USING A CATALYST SYSTEM CONTAINING RUTHENIUM AND AN ACIDIC COMPONENT

TECHNICAL FIELD

The present invention relates to a process for the conversion of synthesis gas to liquid hydrocarbons in the presence of a catalyst system containing a supported ruthenium (Ru) component and an acidic component. More particularly, the present invention relates to conversion of synthesis gas to liquid hydrocarbons using a catalyst comprising particles of ruthenium on a solid metal oxide support in a physical mixture with an acidic hydrocracking catalyst promoted with one or more Group VIII metals that has been subjected to an activation treatment to provide improved activity and selectivity.

BACKGROUND

High quality fuels remain in high demand. Fischer-Tropsch synthesis, which involves the production of hydrocarbons by the catalyzed reaction of mixtures of carbon monoxide (CO) and hydrogen ($H_2$), also referred to as synthesis gas or syngas, can convert natural gas derived synthesis gas to liquid fuels and high-value chemicals. Fischer-Tropsch synthesis is one of the more attractive, direct and environmentally acceptable paths to high quality transportation fuels derived from natural gas.

Fischer-Tropsch catalysts are typically based on group VIII metals such as, for example, iron, cobalt, nickel and ruthenium. Such known catalysts are nonselective for a particularly desired product distribution, namely high levels of $C_{5+}$ products and low levels of light gas. Processes using such catalysts are generally governed by the Anderson-Schulz-Flory (ASF) polymerization kinetics.

Hybrid Fischer-Tropsch catalyst systems including a Fischer-Tropsch component and an acidic component, such as a zeolite, have been found to be capable of limiting product chain growth in the Fischer-Tropsch reaction to a desired product distribution. Ruthenium, usually known as a promoter for cobalt, is a Fischer-Tropsch active metal that provides surprisingly low methane formation when used as the primary Fischer-Tropsch component. However, certain limitations exist in ruthenium-catalyzed Fischer-Tropsch systems. Ruthenium-catalyzed Fischer-Tropsch products are of much higher molecular weight than those from analogous cobalt-catalyzed reactions, therefore likely to contain a hard solid wax phase. Depending on the proximity of ruthenium to the zeolite pores and the freedom of the ruthenium to migrate into the zeolite channels, high molecular weight wax can form in the zeolite pores and effectively depress the overall catalytic activity.

It would be desirable to have a catalyst system containing ruthenium, with its propensity for low light gas production, and an acidic component which limits product chain growth in the Fischer-Tropsch reaction, while avoiding the limitations caused by ruthenium described above. It would be further desirable to have a process for the conversion of synthesis gas to liquid hydrocarbons in the presence of such a catalyst system to form a liquid hydrocarbon product free of a solid wax phase.

SUMMARY

In one aspect, the invention relates to a method of performing a synthesis gas conversion reaction comprising contacting a catalyst mixture comprising Fischer-Tropsch catalyst particles including ruthenium deposited on a metal oxide support and acidic component catalyst particles including an acidic component with synthesis gas having a $H_2$ to CO molar ratio of 0.5 to 3.0 at a reaction temperature of 200° to 350° C., a total pressure of 3 to 35 atmospheres, and an hourly space velocity of 5 to 10,000 v/v/hours; thereby resulting in a hydrocarbons product containing 1-15 weight % $CH_4$ and 0-5 weight % $C_{21+}$ normal paraffins.

In another aspect, the invention relates to a method of performing a synthesis gas conversion reaction comprising contacting a catalyst mixture comprising Fischer-Tropsch catalyst particles including ruthenium deposited on a metal oxide support and acidic component catalyst particles including an acidic component with synthesis gas having a $H_2$ to CO molar ratio of 0.5 to 3.0, a total pressure of 3 to 35 atmospheres, and an hourly space velocity of 5 to 10,000 v/v/hours; wherein the reaction occurs at a reaction temperature sufficient to result in a hydrocarbons product containing 1-15 weight % $CH_4$ and 0-5 weight % $C_{21+}$ normal paraffins.

DETAILED DESCRIPTION

A catalyst system for synthesis gas conversion is described. The catalyst system comprises a physical mixture of Fischer-Tropsch catalyst particles including ruthenium on a solid metal oxide support and separate particles of an acidic component, e.g., a zeolite, which has been promoted with one or more Group VIII metals to enhance hydrocracking activity and selectivity. For the purposes of the present invention, group VIII metals are those metals in Group VIII of the Periodic Table of the Elements, according to the Periodic Table of the Elements as provided in the Handbook of Chemistry and Physics, 62nd edition, 1981 to 1982, Chemical Rubber Company. The physically mixed catalyst particles are activated by a low-temperature reduction cycle.

The Fischer-Tropsch functionality of the catalyst system is provided by ruthenium loaded particles which can be formed by any known means for depositing a ruthenium compound onto a solid metal oxide support, including, but not limited to, precipitation, impregnation and the like. Any technique known to those having ordinary skill in the art to distend the ruthenium in a uniform manner on the support is suitable. As used herein, the phrases "Fischer-Tropsch catalyst particles" and "ruthenium loaded particles" are used interchangeably to refer to catalyst particles having ruthenium metal distributed as crystallites on the metal oxide support. Suitable support materials for use in the Fischer-Tropsch catalyst particles include, by way of example and not limitation, porous solid metal oxides such as alumina, silica, titania, magnesia, zirconia, chromia, thoria, boria, beryllia and mixtures thereof.

Initially, the metal oxide support can be treated by oxidative calcination at a temperature in the range of, for example, from about 450° to about 900° C. to remove water and any organics from the metal oxide structure. The calcined zeolite support should not be unduly exposed to atmospheric humidity so as to become rehydrated.

In one embodiment, ruthenium is deposited onto the porous solid metal oxide support by impregnation to form the ruthenium loaded particles. Any suitable impregnation technique can be employed including techniques well known to those skilled in the art so as to distend the catalytic metals in a uniform thin layer on the metal oxide support. For example, ruthenium can be deposited on the metal oxide support material by the "incipient wetness" technique. Such technique is well known and requires that the volume of aqueous or non-aqueous solution containing a soluble ruthenium compound such as, for example, a salt and, if desired, a soluble promoter metal, be predetermined so as to provide the minimum volume which will just wet the entire surface of the metal oxide support, with no excess liquid. The solution and metal oxide support are stirred while evaporating the solvent at a temperature of from about 25° C. to about 85° C. until "dryness." Alternatively, the excess solution technique can be utilized if desired, in which excess solvent is removed by evaporation.

Suitable ruthenium compounds for use in the aqueous or nonaqueous solution include, for example, ruthenium nitrosyl nitrate, ruthenium acetate, ruthenium carbonyl, ruthenium acetylacetonate, ruthenium chloride or the like. Other $Ru^{+3, +4, +6, +7, and +8}$ known compounds may be used. Suitable solvents include, for example, water; ketones, such as acetone, butanone (methyl ethyl ketone); the lower alcohols, e.g., methanol, ethanol, propanol and the like; amides, such as dimethyl formamide; amines, such as butylamine; ethers, such as diethylether and tetrahydrofuran; hydrocarbons, such as pentane and hexane; and mixtures of the foregoing solvents. In an exemplary embodiment, the solvents are acetone, for ruthenium nitrate or tetrahydrofuran.

The impregnated catalyst is slowly dried at a temperature of from about 110° to about 120° C. for a period of about 2 hours so as to spread the metals over the entire metal oxide support. The drying step is conducted at a very slow rate in air. After drying, the ruthenium crystallites on this impregnated solid are effectively immobilized on the support. The ruthenium crystallites on the support have a crystallite size between about 1 nm and about 20 nm.

The dried catalyst subsequently is calcined by heating slowly in flowing air, for example 10 cc/gram/minute, to a temperature in the range of from about 200° to about 350° C., for example, from about 250° to about 300° C. The aforesaid drying and calcination steps can be done separately or can be combined. However, calcination should be conducted by using a slow heating rate of, for example, 0.5° to about 3° C. per minute or from about 0.5° to about 1° C. per minute and the catalyst should be held at the maximum temperature for a period of about 1 to about 20 hours, for example, for about 2 hours.

The foregoing impregnation steps can be repeated, with intervening drying and low temperature (below 300° C.) calcination treatments to disperse and decompose the metal salts, in order to obtain the desired metal loading. In one embodiment, the ruthenium content can vary from 0.1 weight % to 10 weight %; in another embodiment, from 0.5 to 5 weight %. Ruthenium and other promoter metal and/or metal oxides are conveniently added together with ruthenium, but they may be added in other impregnation steps, separately or in combination, either before, after, or between impregnations of ruthenium.

Optionally, a promoter element selected from iron (Fe), cobalt (Co), molybdenum (Mo), manganese (Mn), praseodymium (Pr), rhodium (Rh), platinum (Pt), palladium (Pd), copper (Cu), silver (Ag), gold (Au), zinc (Zn), cadmium (Cd), rhenium (Rh), nickel (Ni), potassium (K), chromium (Cr), zirconia (Zr), cerium (Ce) and niobium oxide can be added to improve the activity. Manganese and rhenium are promoters which enhance the diesel range products. Higher loadings of Ru without a promoter favor gasoline range products. For a catalyst containing about 1-5 weight % ruthenium, for example, the amount of rhenium can be from about 0.1 to about 1 weight %, for example, from about 0.05 to about 0.5 weight % based upon total catalyst weight. The amount of rhenium would accordingly be proportionally higher or lower for higher or lower ruthenium levels, respectively.

In one embodiment, no cobalt compounds are added during the Fischer-Tropsch catalyst preparation and the catalyst is essentially free of cobalt. By essentially free of cobalt is meant that the Fischer-Tropsch catalyst contains less than 0.1 weight percent cobalt.

Separately, acidic components, e.g., zeolites are extruded as shaped bodies and impregnated with one or more Group VIII promoter metal(s). The promoter metals provide for enhanced activity and stability in the hydrocracking of large hydrocarbon molecules.

Suitable acidic components are selected from amorphous silica-alumina, tungstated zirconia, zeolitic crystalline small pore molecular sieves, non-zeolitic crystalline small pore molecular sieves, zeolitic crystalline medium pore molecular sieves, non-zeolitic crystalline medium pore molecular sieves, zeolitic crystalline large and extra large pore molecular sieves, non-zeolitic crystalline large and extra large pore molecular sieves and zeolite analogs. A zeolite is a molecular sieve that contains silica in the tetrahedral framework positions. Examples include, but are not limited to, silica-only (silicates), silica-alumina (aluminosilicates), silica-boron (borosilicates), silica-germanium (germanosilicates), alumina-germanium, silica-gallium (gallosilicates) and silica-titania (titanosilicates), and mixtures thereof.

Molecular sieves, in turn, are crystalline materials that have regular passages (pores). If examined over several unit cells of the structure, the pores will form an axis based on the same units in the repeating crystalline structure. While the overall path of the pore will be aligned with the pore axis, within a unit cell, the pore may diverge from the axis, and it may expand in size (to form cages) or narrow. The axis of the pore is frequently parallel with one of the axes of the crystal. The narrowest position along a pore is the pore mouth. The pore size refers to the size of the pore mouth. The pore size is calculated by counting the number of tetrahedral positions that form the perimeter of the pore mouth. A pore that has 10 tetrahedral positions in its pore mouth is commonly called a 10 membered ring pore. Pores of relevance to catalysis in the present invention have pore sizes of 8 tetrahedral positions (members) or greater. If a molecular sieve has only one type of relevant pore with an axis in the same orientation to the crystal structure, it is called 1-dimensional. Molecular sieves may have pores of different structures or may have pores with the same structure but oriented in more than one axis related to the crystal.

Small pore molecular sieves are defined herein as those having 8 membered rings; medium pore molecular sieves are defined as those having 10 membered rings; large pore molecular sieves are defined as those having 12 membered rings; extra-large molecular sieves are defined as those having 14+ membered rings.

Mesoporous molecular sieves are defined herein as those having average pore diameters between 2 and 50 nm. Representative examples include the M41 class of materials, e.g. MCM-41, in addition to materials known as SBA-15, TUD-1, HMM-33, and FSM-16.

Exemplary acidic components for use in the catalyst system include, but are not limited to, those medium pore molecular sieves designated EU-1, ferrierite, heulandite, clinoptilolite, ZSM-11, ZSM-5, ZSM-57, ZSM-23, ZSM-48, MCM-22, NU-87, SSZ-44, SSZ-58, SSZ-35, SSZ-46 (MEL), SSZ-57, SSZ-70, SSZ-74, SUZ-4, Theta-1, TNU-9, IM-5 (IMF), ITQ-13 (ITH), ITQ-34 (ITR), and silicoaluminophosphates designated SAPO-11 (AEL) and SAPO-41 (AFO). The three letter designation is the name assigned by the IUPAC Commission on Zeolite Nomenclature.

Exemplary acidic components for use in the catalyst system include, but are not limited to, those large pore molecular sieves designated Beta (BEA), CIT-1, Faujasite, H-Y, Linde Type L, Mordenite, ZSM-10 (MOZ), ZSM-12, ZSM-18 (MEI), MCM-68, gmelinite (GME), cancrinite (CAN), mazzite/omega (MAZ), SSZ-26 (CON), MTT (e.g., SSZ-32, ZSM-23 and the like), SSZ-33 (CON), SSZ-37 (NES), SSZ-41 (VET), SSZ-42 (IFR), SSZ-48, SSZ-55 (ATS), SSZ-60, SSZ-64, SSZ-65 (SSF), ITQ-22 (IWW), ITQ-24 (IWR), ITQ-26 (IWS), ITQ-27 (TWV), and silicoaluminophosphates designated SAPO-5 (AFI), SAPO-40 (AFR), SAPO-31 (ATO), SAPO-36 (ATS) and SSZ-51 (SFO).

Exemplary acidic components for use in the catalyst system include, but are not limited to, those extra large pore molecular sieves designated CIT-5, UTD-1 (DON), SSZ-53, SSZ-59, and silicoaluminophosphate VPI-5 (VFI).

The acidic component can have an external surface area of between about 100 $m^2/g$ and about 300 $m^2/g$, a porosity of between about 30 and 80%, and a crush strength of between about 1.25 and 5 lb/mm Si/Al ratio for the acidic component can be 10 or greater, even between about 10 and 100.

Use of extruded, shaped catalyst bodies has been found to be beneficial as the acidic component, for the relatively larger extrudate particles will cause less pressure drop within a reactor and be subject to less attrition than zeolite powder or even granular zeolite (e.g., having a particle size of about 300-1000 μm).

The resulting ruthenium loaded particles and promoter metal-impregnated acidic component shaped bodies are calcined, crushed and sieved to particle sizes useful in fixed bed reactions. In one embodiment, the sized sets of particles have an average particle diameter, which depends upon the type of reactor to be utilized, of from about 0.5 to about 6 mm for a fixed bed; and for example, from about 0.01 to about 0.11 mm for a reactor with the catalyst suspended by gas, liquid, or gas-liquid media (e.g., fluidized beds, slurries, or ebullating beds). The particle size is selected to be sufficiently fine to avoid channeling of the feed and sufficiently coarse to avoid high-pressure drops across the reactor. Particle diameter can be determined using any means known to one skilled in the art, including, but not limited to, sieving or screening, observing the rate of sedimentation, observation via microscopy, etc. For the purposes of the present invention, particle diameter is determined by sieving.

The ruthenium loaded particles and the promoter metal-impregnated acidic component particles are mixed at a ratio that provides for the efficient conversion of Fischer-Tropsch wax into liquid products. In one embodiment, the weight ratio of acidic component to ruthenium is between 1:1 and 1000:1; in another embodiment, the weight ratio of acidic component to ruthenium is between 5:1 and 300:1; in yet another embodiment, the weight ratio of acidic component to ruthenium is between 10:1 and 100:1. The weights of the acidic component and the ruthenium component are intended herein to include the weight of the active catalyst material as well as any optional metal promoters, but not the weight of any binder materials. If the ratio is below this range, the resulting product may undesirably contain solid wax. If the ratio is above this range, the product may be undesirably light.

The catalyst mixture optionally contains particles of a second acidic component.

The two or more sets of particles of the catalyst system, i.e., the ruthenium loaded particles and the promoter metal-impregnated acidic component particles and optional second acidic component particles, are well mixed physically and charged to a reactor tube. In one embodiment, a multi-tubular fixed bed reactor is used.

The ruthenium content of the catalyst system will depend on the relative amounts of ruthenium loaded particles and promoted zeolite particles. For example, if one part of synthesis conversion catalyst comprised of 5% ruthenium on alumina is physically mixed with one part of alumina-bound zeolite by weight, then the resultant catalyst system will contain 2.5% ruthenium. The overall catalyst system can contain, for example, from about 1 to about 20 weight % ruthenium, preferably 1 to about 3 weight % ruthenium, based on total catalyst weight, at the lowest support content. At the highest support content the catalyst can contain, for example, from about 1 to about 20 weight % ruthenium, preferably from about 2 to about 10 weight % ruthenium, based on total catalyst weight (including binder weight).

The catalyst system, i.e., the catalyst mixture, is activated by one of a single reduction step, reduction-oxidation cycle, or reduction-oxidation-reduction cycle to increase catalytic activity resulting in improved reaction rates.

In one embodiment, activation is conducted by reducing in the presence of hydrogen, e.g., pure hydrogen or a mixture of hydrogen and nitrogen, at a low temperature, i.e., in the range 100° C. to 500° C.; in another embodiment, the activation procedure is conducted at a temperature in the range 100° C. to 300° C.; in yet another embodiment, the activation procedure is conducted at a temperature in the range 100° C. to 250° C. Reduction should be conducted slowly enough and the flow of the reducing gas maintained high enough to maintain the partial pressure of water in the offgas below 1%, so as to avoid excessive steaming. Before and after all reductions, the catalyst must be purged in an inert gas such as nitrogen, argon or helium.

In one embodiment, the reduced catalyst is passivated at ambient temperature (25°-35° C.) by flowing diluted air over the catalyst slowly enough so that a controlled exotherm of no larger than +50° C. passes through the catalyst bed. If an oxidation step is desired, the catalyst is heated slowly in diluted air to a temperature of from about 200° C. to about 300° C. The temperature of the exotherm during the oxidation step should be less than 100° C., and can be 50-60° C. if the flow rate and/or the oxygen concentration are sufficiently dilute. If the exotherm temperature is less than this, the oxygen is so dilute that an excessively long time will be needed to accomplish the oxidation. It is desirable to avoid localized temperatures exceeding 500° C., at which volatile, highly toxic oxides may be formed.

If a further reduction step is desired, the reoxidized catalyst is slowly reduced again in the presence of hydrogen, in the same manner as previously described in connection with the initial reduction of the catalyst system.

The charge stock used in the process of the present invention is a mixture of CO and hydrogen, i.e., synthesis gas, having a $H_2$ to CO molar ratio of 0.5 to 3.0, even 1.0 to 2.0. Any suitable source of the CO and hydrogen can be used. The charge stock can be obtained, by way of example and not limitation, by (i) the oxidation of coal or other forms of carbon with scrubbing or other forms of purification to yield the desired mixture of CO and $H_2$ or (ii) the reforming of natural gas. $CO_2$ is not a desirable component of the charge stocks for use in the process of the present invention, but it may be present as a diluent gas. Sulfur compounds in any form are deleterious to the life of the catalyst and should be removed from the synthesis gas and from any diluent gases.

The reaction temperature is suitably from about 200° to about 350° C. When relatively low levels of acidic component are used, relatively higher reaction temperatures can be used than when relatively high levels of acidic component are used, in order to obtain a product substantially free of solid wax. For example, in one embodiment, at weight ratios of acidic component to ruthenium of less than about 50:1, the reaction temperature is preferably greater than about 250° C., even from 270° to about 350° C. In another embodiment, at weight ratios of acidic component to ruthenium of greater than about 50:1, the reaction temperature can be between 200° and 350° C., even from 220° to about 350° C.

The total pressure is, for example, from about 1 to about 100 atmospheres, for example, from about 3 to about 35 atmospheres or from about 10 to about 30 atmospheres.

The gaseous hourly space velocity based upon the total amount of feed is less than 20,000 volumes of gas per volume of catalyst per hour, for example, from about 5 to about 10,000 v/v/hour or from about 1000 to about 2500 v/v/hour. If desired, pure synthesis gas can be employed or, alternatively, an inert diluent, such as nitrogen, $CO_2$, methane, steam or the like can be added. The phrase "inert diluent" indicates that the diluent is non-reactive under the reaction conditions or is a normal reaction product.

The synthesis gas reaction using the catalyst system of the present invention can occur in a fixed, fluid or moving bed type of operation.

The hydrocarbon mixture formed in the reaction can range from methane to light wax, containing only trace amounts (<0.5 wt %) of carbon numbers above 30, and may include linear, branched and cyclic compounds. As defined herein, the terms "wax" and "solid wax" refer to $C_{21+}$ normal paraffins. The terms "Fischer-Tropsch wax" and "$C_{21+}$ wax" are also used herein interchangeably to refer to $C_{21+}$ normal paraffins.

The combination of a ruthenium-based Fischer-Tropsch component with an acidic component (e.g., zeolite) results in enhanced selectivity for desirable products, i.e., low $CH_4$ levels, high $C_{5+}$ levels and low $C_{21+}$ n-paraffins. The branched nature of the carbon chain products make them beneficial for transportation fuels having low temperature pour, cloud or freeze points. Waxy products formed on the ruthenium component are cracked (i.e., by the acidic component) into mainly branched hydrocarbons with limited formation of aromatics. In one embodiment, in a single-stage Fischer-Tropsch reaction, the presently disclosed catalyst system provides the following at ambient conditions:

1-15 weight % $CH_4$;
1-15 weight % $C_2$-$C_4$;
70-95, weight % $C_{5+}$;
0-5 weight % $C_{21+}$ normal paraffins; and
0-10, or even 0-5, weight % aromatic hydrocarbons.

In one embodiment, the hydrocarbon mixture produced is substantially free of solid wax by which is meant that the product is a single liquid phase at ambient conditions without the visibly cloudy presence of an insoluble solid wax phase. According to this embodiment, the hydrocarbon mixture produced contains 0-5 weight % $C_{21+}$ normal paraffins at ambient conditions. In a typical Fischer-Tropsch process, the product obtained is predominantly a normal or linear paraffin product, meaning free of branching. If the $C_{21+}$ fraction present within a $C_{5+}$ product is predominantly linear and greater than 5 weight %, the product has been found to contain a separate, visible solid wax phase. Products of the present process may actually contain $C_{21+}$ at greater than 5 weight % without a visible solid wax phase. Branched paraffins have lower melting points compared with normal or linear paraffins such that products of the present process can contain a greater percentage of $C_{21+}$ fraction and still remain a liquid which is free of a separate, visible solid wax phase at ambient conditions. The result is a product which is liquid and pourable at ambient conditions. Liquid hydrocarbons produced by the present process advantageously have a cloud point as determined by ASTM D 2500-09 of 15° C. or less, even 10° C. or less, even 5° C. or less, and even as low as 2° C.

By "ambient conditions" is meant a temperature of 15° C. and a pressure of 1 atmosphere (100 kPa).

The following illustrative examples are intended to be non-limiting.

Test Methods

Surface area, pore volume and pore size distribution of catalyst samples were determined by $N_2$ physisorption using Micromeritics® Tristar® 3000 automated system (available from Micromeritics Instrument Corporation, Norcross, Ga.). The surface area was calculated following the BET method and the micropore volume was calculated following the deBoer t-plot method.

Crystallite diameter of metal crystallites on catalyst samples was calculated using $H_2$ chemisorption data assuming crystallites are spherical in shape, and reported in nm $H_2$ chemisorption data was obtained by temperature programmed desorption (TPD) using a Zeton Altamira AMI-200 unit (available from Altamira Instruments, Inc., Pittsburgh, Pa.). The sample weight was 0.22 g. The sample was activated using hydrogen at 250° C. for 10 hours and cooled under flowing hydrogen to 100° C. The sample was held at 100° C. under flowing argon to remove physisorbed and/or weakly bound species, prior to increasing the temperature slowly to 250° C. The catalyst was held under flowing argon to desorb the remaining chemisorbed hydrogen. The TPD spectrum was integrated and the number of moles of desorbed hydrogen determined by comparing to the areas of calibration pulses of hydrogen in argon. $H_2$ uptake in mol/$g_{cat}$ was determined as: (analytical area from TPD×calibration value)/(sample weight×24.5). Dispersion (%) was calculated as: ($H_2$ uptake×atomic weight×stoichiometry)/percentage metal. Finally, the diameter of the metal crystallites was calculated as: 6000/(density of the metal×maximum surface area as reported by the instrument×dispersion). The method assumes complete reduction of the Ru metal, complete coverage of Ru surface sites, complete adsorption of all of the desorbed hydrogen on the Ru, and a stoichiometric ratio of one H atom per surface ruthenium atom for the adsorbed hydrogen.

EXAMPLES

Catalyst Preparation Methods

Catalyst A: Synthesis Gas Conversion Catalyst Comprising 5 Weight % Ru-5 Weight % Mn and 90 Weight % $Al_2O_3$ An alumina support having a BET surface area of 203 m²/g (obtained from Sasol Chemicals North America LLC, Houston, Tex.) was impregnated by an aqueous solution of $Mn(NO_3)_2 \cdot 6H_2O$ (obtained from Sigma-Aldrich, St. Louis, Mo.) and then water was removed in a rotary evaporator under vacuum by heating slowly to 65° C. The vacuum-dried material was then further dried in air at 120° C. for 16 hours in a box furnace and was subsequently calcined in air by raising its temperature at a heating rate of 2° C./min to 600° C. and holding it at that temperature for 2 hours before cooling it to ambient temperature. Next, ruthenium was incorporated by impregnating the support with aqueous solution of $RuCl_3 \cdot 3H_2O$ (obtained from Alfa Aesar, Ward Hill, Mass.). After removal of water by heating, the dried material was further dried in air at 120° C. for 16 hours in a box furnace and was subsequently calcined in air by raising its temperature at a heating rate of 2° C./min to 450° C. and holding it at that temperature for 2 hours. Properties of the catalyst are given below.

| BET Surface Area, m²/g | Pore Volume, cm³/g | Dispersion, % | Average Crystallite Diameter, nm |
|---|---|---|---|
| 172.3 | 0.41 | 16.87 | 8 |

Catalyst B: Hydrocracking Catalyst Comprising 0.5% Pt-0.5% Pd Supported on 80 Weight % Beta and 20 Weight % Alumina 0.3017 g of tetraammineplatinum(II) nitrate and 4.25 g of tetraamminepalladium(II) nitrate solution were dissolved in 30 cc of water. This solution was then added to 30 g of alumina (20% alumina) bound beta zeolite (Si/Al=19), which was purchased from Zeolyst International (Conshohocken, Pa.). The water was then removed in a rotary evaporator by heating slowly to 65° C. The vacuum-dried material was then dried in an oven at 120° C. overnight and finally calcined at 300° C. for 2 hours in a muffle furnace.

Catalyst C: Hydrocracking Catalyst Comprising 0.5% Pd Supported on 80 Weight % ZSM-5 and 20 Weight % Alumina 1.305 g of palladium nitrate salt was dissolved in 120 cc of water. The palladium solution was added to 120 g of the same alumina (20% alumina) bound ZSM-5 zeolite described in Example 1. The water was removed in a rotary evaporator by heating slowly to 65° C. The vacuum-dried material was dried in air in an oven at 120° C. overnight and finally calcined at 300° C. for 2 hours in a muffle furnace.

Example 1

Synthesis Gas Conversion Using Mixture of Catalyst A and Catalyst B 10 grams of Catalyst A of particle size 850-425 μm and 20 grams of Catalyst B of particle size 850-425 μm were mixed thoroughly and then diluted with 20 grams of gamma-alumina. The catalyst mixture was placed to the center of a 316 stainless steel tube reactor 5 ft. (1.5 m) long and 0.5" (1.3 cm) in inner diameter with a 0.25" (0.64 cm) thermo well. The zeolite/Ru ratio and percent Ru content of the catalyst mixture by weight were 32 and 1.6%, respectively. The total volume of the catalyst mixture including dilution was 70 cc which corresponds to 28" (71 cm) of catalyst bed. The reactor was then placed in a reactor furnace. The catalyst beds were flushed with a downward flow of argon for a period of two hours, after which time the gas feed was switched to pure hydrogen at a flow rate of 400 sccm. The temperature was slowly raised to 250° C. at a temperature interval of 1° C./minute and held constant for 10 hours. After this time, the catalyst beds were cooled to 180° C. while remaining under a flow of pure hydrogen gas. All flows were directed downward.

To study the effect of temperature on synthesis gas conversion using the catalyst system of Example 1, catalysts as prepared and activated above were contacted with hydrogen and carbon monoxide in ratios between 1.5 and 2.0 at temperatures between 205° C. and 300° C., at a total pressure of 5-20 atm (gauge) and a total gas flow rate of 2100-6000 cubic centimeters of gas (0° C., 1 atm) per gram of catalyst per hour. The results are set forth in Table 1. At these conditions with this weight ratio of zeolite to ruthenium, there is a significant amount of solid wax formed in the temperature range 220° C. to 250° C. At a reaction temperature greater than 270° C., there is no significant amount of wax formed. The products were analyzed by gas chromatography.

TABLE 1

| Time on Stream (TOS), h | 47.25 | 118.58 | 166.05 | 213.18 | 289.03 | 334.78 | 381.00 | 1489.35 | 863.43 |
|---|---|---|---|---|---|---|---|---|---|
| Reaction Temp, ° C. | 220 | 225 | 230 | 235 | 240 | 245 | 250 | 270 | 280 |
| Reaction Pressure, atm | 20 | 20 | 20 | 20 | 20 | 20 | 20 | 20 | 20 |
| $H_2$/CO, Feed | 2.00 | 2.00 | 2.00 | 2.00 | 2.00 | 2.00 | 2.00 | 2.00 | 2.00 |
| GHSV, SL/h/g | 2.0 | 2.0 | 2.0 | 2.0 | 2.0 | 2.0 | 2.0 | 2.0 | 2.0 |
| CO Conv, mole % | 24.7% | 34.1% | 41.5% | 47.8% | 54.2% | 60.4% | 61.4% | 52.0% | 77.8% |
| $H_2$ Conv, mole % | 26.1% | 35.7% | 42.9% | 50.3% | 56.8% | 63.6% | 65.4% | 52.2% | 82.8% |
| Total Conv, mole % | 25.6% | 35.2% | 42.4% | 49.4% | 55.9% | 62.5% | 64.1% | 52.2% | 81.1% |
| Rate, g$CH_2$/g/h | 0.103 | 0.142 | 0.173 | 0.199 | 0.226 | 0.251 | 0.256 | 0.217 | 0.324 |
| Rate, mL$C_{5+}$/g/h | 0.109 | 0.154 | 0.188 | 0.219 | 0.250 | 0.267 | 0.267 | 0.202 | 0.305 |
| $CH_4$, selectivity | 5.9% | 5.9% | 7.4% | 7.1% | 7.4% | 9.3% | 10.4% | 11.7% | 12.6% |
| $C_2$, selectivity | 1.6% | 1.4% | 1.5% | 1.4% | 1.4% | 1.5% | 2.0% | 3.5% | 3.2% |
| $C_3$, selectivity | 5.4% | 4.5% | 4.2% | 4.0% | 3.7% | 3.9% | 4.4% | 5.9% | 4.9% |
| $C_4$, selectivity | 6.5% | 6.1% | 4.8% | 4.4% | 4.0% | 5.2% | 4.3% | 4.7% | 3.7% |
| $C_{5+}$, selectivity | 79.5% | 81.4% | 81.5% | 82.5% | 83.1% | 79.7% | 78.4% | 69.8% | 73.6% |
| $CO_2$, selectivity | 1.1% | 0.7% | 0.6% | 0.6% | 0.5% | 0.5% | 0.6% | 4.4% | 1.9% |
| $C_{21+}$, selectivity | 28% | 42% | 45% | 44% | 43% | 46% | 45% | 5% | 3% |

To study the effect of $H_2$/CO ratio on synthesis gas conversion using the catalyst system of Example 1, catalysts as prepared and activated above were contacted with hydrogen and carbon monoxide in molar ratios between 1.0 and 2.0 at temperature of 250° C., with a total pressure of 20 atm and a total gas flow rate of 2000 cubic centimeters of gas (0° C., 1 atm) per gram of catalyst per hour. The results are set forth in Table 2. As can be seen, there is a significant amount of solid wax formed at temperature 250° C. regardless of $H_2$/CO ratio.

TABLE 2

| TOS, h | 381.00 | 478.00 | 526.97 | 553.00 |
|---|---|---|---|---|
| Reaction Temp, ° C. | 250 | 250 | 250 | 250 |
| Reaction Pressure, atm | 20 | 20 | 20 | 20 |
| $H_2$/CO, Feed | 2.00 | 1.60 | 1.30 | 1.00 |
| GHSV, SL/h/g | 2.0 | 2.0 | 2.0 | 2.0 |
| CO Conv, mole % | 61.4% | 44.6% | 33.2% | 25.2% |
| $H_2$ Conv, mole % | 65.4% | 56.3% | 51.8% | 49.0% |
| Total Conv, mole % | 64.1% | 51.8% | 43.7% | 37.1% |
| Rate, g$CH_2$/g/h | 0.256 | 0.214 | 0.180 | 0.157 |
| Rate, mL$C_{5+}$/g/h | 0.267 | 0.246 | 0.213 | 0.190 |
| $CH_4$, selectivity | 10.4% | 4.6% | 3.1% | 2.2% |
| $C_2$, selectivity | 2.0% | 1.1% | 0.9% | 0.8% |
| $C_3$, selectivity | 4.4% | 3.4% | 2.8% | 2.3% |

TABLE 2-continued

| TOS, h | 381.00 | 478.00 | 526.97 | 553.00 |
|---|---|---|---|---|
| $C_4$, selectivity | 4.3% | 4.1% | 3.7% | 3.3% |
| $C_{5+}$, selectivity | 78.4% | 86.2% | 88.8% | 90.6% |
| $CO_2$, selectivity | 0.6% | 0.6% | 0.6% | 0.8% |
| $C_{21+}$, selectivity | 45% | 48% | 49% | 46% |

To study the effect of $H_2$/CO ratio on synthesis gas conversion using the catalyst system of Example 1 at higher temperature, catalysts as prepared and activated above were contacted with hydrogen and carbon monoxide in ratios between 1.0 and 2.0 at temperature of 280° C., with a total pressure of 20 atm and a total gas flow rate of 2000 cubic centimeters of gas (0° C., 1 atm) per gram of catalyst per hour. The results are set forth in Table 3. Under the conditions of this experiment the catalyst produced a high percentage of $C_{5+}$ liquid product substantially free of solid wax.

TABLE 3

| TOS, h | 863.43 | 1030.15 | 1054.78 | 1151.72 |
|---|---|---|---|---|
| Reaction Temp, ° C. | 280 | 280 | 280 | 280 |
| Reaction Pres, atm | 20 | 20 | 20 | 20 |
| $H_2$/CO, Feed | 2.00 | 1.60 | 1.30 | 1.00 |
| GHSV, SL/h/g | 2.0 | 2.0 | 2.0 | 2.0 |
| CO Conv, mole % | 77.8% | 57.7% | 44.3% | 37.4% |
| $H_2$ Conv, mole % | 82.8% | 73.3% | 68.4% | 74.0% |
| Total Conv, mole % | 81.1% | 67.3% | 57.9% | 55.7% |
| Rate, $gCH_2$/g/h | 0.324 | 0.277 | 0.240 | 0.233 |
| Rate, $mLC_{5+}$/g/h | 0.305 | 0.279 | 0.242 | 0.258 |
| $CH_4$, selectivity | 12.6% | 10.8% | 9.9% | 6.3% |
| $C_2$, selectivity | 3.2% | 2.8% | 2.5% | 1.8% |
| $C_3$, selectivity | 4.9% | 4.7% | 4.3% | 3.0% |
| $C_4$, selectivity | 3.7% | 3.8% | 4.0% | 3.1% |
| $C_{5+}$, selectivity | 73.6% | 75.4% | 76.7% | 84.0% |
| $CO_2$, selectivity | 1.9% | 2.5% | 2.5% | 1.9% |
| $C_5$-$C_9$, selectivity | 38.0% | 39.0% | 36.8% | 37.7% |
| $C_{10}$-$C_{20}$, selectivity | 32.7% | 34.3% | 37.1% | 42.8% |
| $C_{21+}$, selectivity | 2.9% | 2.1% | 3.9% | 4.0% |

Example 2

Synthesis Gas Conversion Using Mixture of Catalysts A, B and C 10 grams of Catalyst A of particle size 850-425 μm, 20 grams of Catalyst B of particle size 850-425 μm and 20 grams of Catalyst C were mixed thoroughly. The catalyst mixture was placed to the center of a 316 stainless steel tube reactor 5 ft. (1.5 m) long and 0.5" (1.3 cm) in inner diameter with 0.25" (0.64 cm) thermo well. The zeolite/Ru ratio and percent Ru content of the catalyst mixture were 64 and 1.0%, respectively. The total volume of the catalyst mixture was 71 cc which corresponds to 27" (68 cm) of catalyst bed. The reactor was then placed in a reactor furnace. The catalyst beds were flushed with a downward flow of argon for a period of two hours, after which time the gas feed was switched to pure hydrogen at a flow rate of 400 sccm. The temperature was slowly raised to 250° C. at a temperature interval of 1° C./minute and held constant for 10 hours. After this time, the catalyst beds were cooled to 180° C. while remaining under a flow of pure hydrogen gas. All flows were directed downward.

To study the effect of temperature on synthesis gas conversion using the catalyst system of Example 2, catalysts as prepared and activated above were contacted with hydrogen and carbon monoxide in ratios between 1.5 and 2.0 at temperatures between 220° C. and 235° C., with a total pressure of 5-20 atm and a total gas flow rate of 2100-6000 cubic centimeters of gas (0° C., 1 atm) per gram of catalyst per hour. The results are set forth in Table 4. At these conditions, a liquid product substantially free of solid wax was produced.

TABLE 4

| TOS, h | 49.05 | 193.42 | 242.40 | 385.72 |
|---|---|---|---|---|
| Reaction Temp, ° C. | 220 | 225 | 230 | 235 |
| Reaction Pres, atm | 20 | 20 | 20 | 20 |
| $H_2$/CO, Feed | 2.00 | 2.00 | 2.00 | 2.00 |
| GHSV, SL/h/g | 1.2 | 1.2 | 1.2 | 1.2 |
| CO Conv, mole % | 18.0% | 25.7% | 27.6% | 29.9% |
| $H_2$ Conv, mole % | 20.4% | 26.7% | 28.3% | 31.5% |
| Total Conv, mole % | 19.6% | 26.4% | 28.1% | 31.0% |
| Rate, $gCH_2$/g/h | 0.045 | 0.064 | 0.069 | 0.075 |
| Rate, $mLC_{5+}$/g/h | 0.047 | 0.070 | 0.072 | 0.078 |
| $CH_4$, selectivity | 3.0% | 3.8% | 4.8% | 5.0% |
| $C_2$, selectivity | 2.0% | 1.6% | 1.8% | 1.8% |
| $C_3$, selectivity | 6.0% | 4.9% | 5.7% | 5.8% |
| $C_4$, selectivity | 8.4% | 6.4% | 7.7% | 8.4% |
| $C_{5+}$, selectivity | 78.8% | 82.0% | 78.7% | 77.9% |
| $CO_2$, selectivity | 1.8% | 1.3% | 1.3% | 1.1% |
| $C_{21+}$, selectivity | 1.9% | 2.1% | 1.7% | 1.2% |

To study the effect of recycle flow ratio on synthesis gas conversion using the catalyst system of Example 2, catalysts as prepared and activated above were contacted with hydrogen and carbon monoxide in ratios between 1.5 and 2.0 at temperature of 235° C., with a total pressure of 5-20 atm, a recycle ratio of 1 to 5, and a total gas flow rate of 2100-6000 cubic centimeters of gas (0° C., 1 atm) per gram of catalyst per hour. Recycle ratio is the ratio of volumetric flow of tail gas to volumetric flow of fresh charge stock entering the reactor.

The results are set forth in Table 5. At these conditions, a liquid product substantially free of solid wax was produced.

TABLE 5

| TOS, h | 478.87 | 580.17 | 745.40 | 814.75 |
|---|---|---|---|---|
| Reaction Temp, ° C. | 235 | 235 | 235 | 235 |
| Reaction Pres, atm | 20 | 20 | 20 | 20 |
| $H_2$/CO, Feed | 1.60 | 2.00 | 2.00 | 2.00 |
| GHSV, SL/h/g | 1.2 | 0.6 | 0.5 | 0.5 |
| Recycle ratio | | 1 | 2 | 3 |
| CO Conv, mole % | 22.3% | 51.0% | 51.9% | 50.4% |
| $H_2$ Conv, mole % | 26.8% | 52.6% | 51.3% | 50.4% |
| Total Conv, mole % | 25.1% | 52.0% | 51.5% | 50.4% |
| Rate, $gCH_2$/g/h | 0.064 | 0.064 | 0.032 | 0.031 |
| Rate, $mLC_{5+}$/g/h | 0.069 | 0.066 | 0.033 | 0.032 |
| $CH_4$, selectivity | 3.6% | 6.3% | 6.2% | 6.0% |
| $C_2$, selectivity | 1.6% | 2.3% | 2.8% | 2.7% |
| $C_3$, selectivity | 5.1% | 5.7% | 4.6% | 4.3% |
| $C_4$, selectivity | 7.6% | 6.3% | 7.0% | 6.8% |
| $C_{5+}$, selectivity | 80.7% | 77.2% | 75.8% | 76.6% |
| $CO_2$, selectivity | 1.4% | 2.3% | 3.6% | 3.6% |
| $C_{21+}$, selectivity | 2.8% | 1.5% | 1.2% | 1.0% |

While various embodiments have been described, it is to be understood that variations and modifications may be resorted to as will be apparent to those skilled in the art. Such variations and modifications are to be considered within the purview and scope of the claims appended hereto.

What is claimed is:

1. A method of performing a synthesis gas conversion reaction comprising contacting a catalyst mixture comprising Fischer-Tropsch catalyst particles including ruthenium deposited on a metal oxide support and acidic component catalyst particles including an acidic component with synthesis gas having a $H_2$ to CO molar ratio of 0.5 to 3.0 at a reaction temperature of 200° to 350° C., a total pressure of 3 to 35 atmospheres, and an hourly space velocity of 5 to 10,000 v/v/hours; thereby resulting in a hydrocarbons product containing 1-15 weight % $CH_4$ and 0-5 weight % $C_{21+}$ normal paraffins.

2. The method of claim 1, wherein the hydrocarbons product further contains 1-15 weight % $C_2$-$C_4$; 70-95 weight % $C_{5+}$; and 0-10 weight % aromatic hydrocarbons.

3. The method of claim 1, wherein the weight ratio of acidic component to ruthenium is between 1:1 and 1000:1.

4. The method of claim 1, wherein the weight ratio of acidic component to ruthenium is between 5:1 and less than 300:1.

5. The method of claim 1, wherein the weight ratio of acidic component to ruthenium is between 10:1 and less than 100:1.

6. The method of claim 1, wherein the acidic component is selected from the group consisting of amorphous silica-alumina, tungstated zirconia, zeolitic crystalline small pore molecular sieves, non-zeolitic crystalline small pore molecular sieves, zeolitic crystalline medium pore molecular sieves, non-zeolitic crystalline medium pore molecular sieves, zeolitic crystalline large and extra large pore molecular sieves, non-zeolitic crystalline large and extra large pore molecular sieves and zeolite analogs.

7. The method of claim 1, wherein the Fischer-Tropsch catalyst contains from 0.1 to 10 wt % ruthenium.

8. The method of claim 1, wherein the Fischer-Tropsch catalyst contains from 0.5 to 5 wt % ruthenium.

9. The method of claim 1, wherein the Fischer-Tropsch catalyst further comprises manganese or rhenium.

10. The method of claim 1, wherein the Fischer-Tropsch catalyst comprises ruthenium crystallites on the metal oxide support having a crystallite size between about 1 nm and about 20 nm.

11. The method of claim 1, wherein the Fischer-Tropsch catalyst is essentially free of cobalt.

12. The method of claim 1, wherein the Fischer-Tropsch catalyst particles and the acidic component catalyst particles have an average particle diameter of from about 0.5 to about 6 mm.

13. The method of claim 1, wherein the acidic component is promoted with platinum or palladium.

14. The method of claim 1, wherein the synthesis gas has a $H_2$ to CO molar ratio of 1.0 to 2.0.

15. The method of claim 1, wherein the reaction temperature is between about 270° C. and about 350° C.

16. The method of claim 1, wherein the catalyst mixture further comprises a second acidic component.

17. The method of claim 1, wherein the reaction temperature is less than 250° C. and the weight ratio of acidic component to ruthenium is between 50:1 and 1000:1.

18. A method of performing a synthesis gas conversion reaction comprising contacting a catalyst mixture comprising Fischer-Tropsch catalyst particles including ruthenium deposited on a metal oxide support and acidic component catalyst particles including an acidic component with synthesis gas having a $H_2$ to CO molar ratio of 0.5 to 3.0, a total pressure of 3 to 35 atmospheres, and an hourly space velocity of 5 to 10,000 v/v/hours; wherein the reaction occurs at a reaction temperature sufficient to result in a hydrocarbons product containing 1-15 weight % $CH_4$ and 0-5 weight % $C_{21+}$ normal paraffins.

19. The method of claim 18, wherein the hydrocarbons product further contains 1-15 weight % $C_2$-$C_4$; 70-95 weight % $C_{5+}$; and 0-10 weight % aromatic hydrocarbons.

* * * * *